(12) United States Patent
Steinberg et al.

(10) Patent No.: US 9,544,256 B2
(45) Date of Patent: Jan. 10, 2017

(54) CROWDSOURCING E-MAIL FILTERING (71) Applicant: TD Ameritrade IP Company, Inc., Omaha, NE (US)

(72) Inventors: Louis Steinberg, Omaha, NE (US); Teresa Hyda, Omaha, NE (US); Jason Vincent, Omaha, NE (US); Vincent M. Ponticelli, Omaha, NE (US); Trent McAuliff, Omaha, NE (US); Joseph Kelly, Omaha, NE (US); Andrew Strear, Omaha, NE (US)

(73) Assignee: TD AMERITRADE IP COMPANY, INC., Omaha, NE (US)

( * ) Notice: Subject to any disclaimer, the term of this patent is extended or adjusted under 35 U.S.C. 154(b) by 510 days.

(21) Appl. No.: 13/931,719

(22) Filed: Jun. 28, 2013

(65) Prior Publication Data

US 2015/0006647 A1   Jan. 1, 2015

(51) Int. Cl.
*G06F 15/16* (2006.01)
*H04L 12/58* (2006.01)

(52) U.S. Cl.
CPC .................................... *H04L 51/12* (2013.01)

(58) Field of Classification Search
CPC ......................................................... H04L 51/12
USPC ......................................................... 709/206
See application file for complete search history.

(56) References Cited

U.S. PATENT DOCUMENTS

| | | | | |
|---|---|---|---|---|
| 7,693,943 B2* | 4/2010 | Rajan | ................... | G06Q 10/107 709/206 |
| 7,882,192 B2* | 2/2011 | Rajan | ................... | G06Q 10/107 348/153 |
| 7,890,588 B2* | 2/2011 | Takahashi | ........... | H04L 67/2828 709/203 |
| 8,204,945 B2* | 6/2012 | Milliken | ............... | G06F 21/562 709/206 |
| 8,219,620 B2* | 7/2012 | Hart | ...................... | H04L 12/585 709/204 |
| 8,380,791 B1* | 2/2013 | Gordon | .................. | H04L 51/12 709/206 |
| 8,880,611 B1* | 11/2014 | Lim | ........................ | H04L 51/12 709/204 |

(Continued)

OTHER PUBLICATIONS

International Search Report with Written Opinion of the International Searching Authority, directed to related International Patent Application No. PCT/US2013/057085, mailed Mar. 28, 2014; 9 pages.

*Primary Examiner* — Melvin H Pollack
(74) *Attorney, Agent, or Firm* — Sterne, Kessler, Goldstein & Fox P.L.L.C.

(57) ABSTRACT

Disclosed herein are system, method, and computer program product embodiments for crowdsourcing e-mail filtering. An embodiment operates by receiving an input from a community member indicating that an e-mail received by the community member is unwanted, counting a number of inputs received from community members indicating that e-mail is unwanted based on one or more criteria, flagging future e-mails based on the criteria when the number of inputs counted reaches a threshold for penalizing an originator or a group associated with the originator of the unwanted e-mail, and denying delivery of future e-mails from the originator or the group associated with the originator until a penalty period expires.

23 Claims, 4 Drawing Sheets

(56) References Cited

U.S. PATENT DOCUMENTS

| | | | | |
|---|---|---|---|---|
| 8,943,308 | B2* | 1/2015 | Bandini | G06Q 10/107 |
| | | | | 713/154 |
| 9,058,376 | B2* | 6/2015 | Lacage | G06F 17/30722 |
| 9,177,293 | B1* | 11/2015 | Gagnon | G06Q 10/107 |
| 9,208,450 | B1* | 12/2015 | Nanda | G06F 17/30011 |
| 9,253,609 | B2* | 2/2016 | Hosier, Jr. | H04W 4/08 |
| 2004/0019651 | A1* | 1/2004 | Andaker | H04L 51/12 |
| | | | | 709/207 |
| 2009/0094340 | A1* | 4/2009 | Gillai | G06F 15/16 |
| | | | | 709/206 |
| 2010/0138512 | A1* | 6/2010 | Morris | G06F 21/31 |
| | | | | 709/207 |
| 2010/0153394 | A1* | 6/2010 | Wood | G06Q 10/107 |
| | | | | 707/737 |
| 2013/0325991 | A1* | 12/2013 | Chambers | H04L 51/12 |
| | | | | 709/206 |
| 2014/0201246 | A1* | 7/2014 | Klein | G06Q 50/01 |
| | | | | 707/803 |
| 2014/0207873 | A1* | 7/2014 | Rao | H04L 51/02 |
| | | | | 709/206 |
| 2014/0358605 | A1* | 12/2014 | Balamurugan | G06Q 10/06311 |
| | | | | 705/7.13 |
| 2015/0381637 | A1* | 12/2015 | Raff | H04L 63/1416 |
| | | | | 726/23 |

* cited by examiner

CROWDSOURCING E-MAIL FILTERING

BACKGROUND

Most spam detection today is done by looking at an incoming message and trying to deduce whether or not it is spam based on keywords in the message. The problem with this approach is that just looking at keywords may not indicate whether or not a message is spam. Further, these approaches are rigid and cannot readily distinguish between spam, as defined by a set of keywords, and e-mail that is unwanted, unsolicited, or annoying.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A problem with existing spam blockers is that they only block "spam." In existing systems, "spam" is often defined by a specific set of keywords. What is needed is a way to filter e-mail that, while potentially valid, may be unwanted. For example, a commercial vendor may keep sending unsolicited marketing materials to members of an organization using e-mail. Several members of a given community may find the unsolicited, persistent, unwanted e-mail annoying, but there has been no way to act on this or to change how the unwanted e-mails are routed in the future based on community recognition that a source or type of e-mail is, for the most part, unwanted. What is needed is a way to filter and act upon such e-mail filtering it out of the normal flow using a community voting system.

A system, method, and computer product are described for crowdsourcing e-mail filtering using an e-mail voting system connected to a network of community members. In an example, e-mails received by the system can be voted on by a community member using a user interface element such as, for example, an "I hate this" button. Such a button, or other widget, may be embedded in the community member's e-mail client and/or may be made accessible through other user interfaces provided by the system. Once user input has been received, the unwanted e-mail is processed and its origin, as well as any relevant information about it, are gathered and processed. As more and more community members exercise their voting power, a crowdsourcer counts the votes and determines whether, and when, enough votes have been received to bounce all future e-mails from that sender or a group of senders associated with each other. The originator of unwanted e-mail may be placed in a penalty box until a specified amount of time elapses and/or until the originator establishes better sending behavior. The placing of the originator in the penalty box may then extend to the originator's community, for example, placing all other senders from the same corporate domain (while white-listing the application of domain level penalties to not broadly penalize public mail services such as yahoo.com and gmail.com).

In an example embodiment, the penalty box is simply a mechanism that allows incoming emails to be filtered out so they are not delivered. As described herein, once filtered the email is returned with a message. The penalty box may include software filters, a database, a look up table, or other mechanisms as would be apparent to one skilled in the art of identifying an incoming email as being flagged for action. The penalty box is thus used for penalizing a sender of unwanted e-mail and/or for penalizing a group associated with the individual sender of unwanted e-mail for exceeding the community threshold. For example, the penalty box may store, analyze, and/or monitor citations in the form of data structures associated with incoming e-mails. Future e-mail is processed to review header fields in order to identify whether incoming e-mail has been sent by an e-mail originator indexed and/or associated with one or more citations in the penalty box. If e-mail is determined to be from an e-mail originator flagged as in the penalty box, a time keeper is prompted to further determine if a penalty has expired or remains in force against the individual sender and/or organization associated with the individual sender. Once in the penalty box, future e-mails from the penalized originator or originator's community will be flagged by the system as unwanted and bounced until the penalty expires. The originator or sender of any penalized e-mail may be notified that their e-mail was not delivered to its intended recipient along with an explanation of why.

Provided herein are system, method and/or computer program product embodiments, and/or combinations and sub-combinations thereof, for crowdsourcing e-mail filtering. The term e-mail as used herein refers to any electronic communication.

Figure 1:
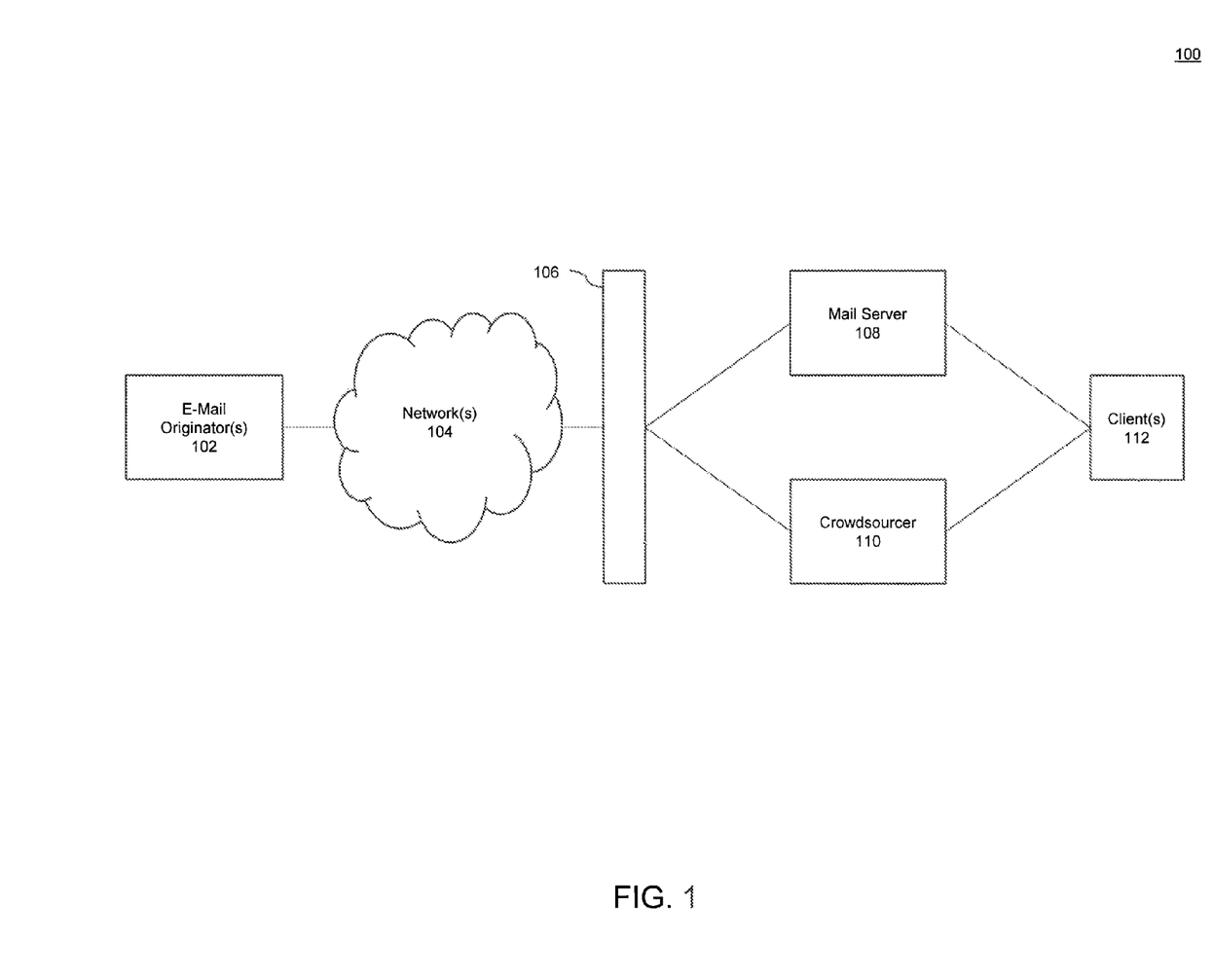
FIG. 1 is a block diagram of an example system architecture for crowdsourcing e-mail filtering.

FIG. 1 shows a system architecture 100 for crowdsourcing e-mail filtering. In an example embodiment, system architecture 100 includes one or more e-mail originators 102 connected by one or more networks 104 to an e-mail receiver 106. E-mail receiver 106 is connected to a mail server 108 and a crowdsourcer 110, each of which is connected to one or more clients 112. E-mail originator 102 may be an individual, an organization, and/or a group of associated origin. E-mail originator 102 may be an individual within a group, an organization, and/or an enterprise and may be identified in various ways, for example, by a name, alias, header data, an e-mail address, an identification (ID), a domain associated with other available data, an electronic signature, an IP address, and/or any other type of identifier. Network 104 may include one or more networks of one or more network types, including any combination of LAN, WAN, the Internet, etc. Network 104 may encompass connections between any or all components in system architecture 100, for example, as between e-mail receiver 106, mail server 108, crowdsourcer 110, and/or clients 112.

In an example embodiment, system architecture 100 is distributed over one or more networks and operates as a cloud computing architecture. Cloud computing includes but is not limited distributed network architecture for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), and/or integration platform as a service (IPaaS), etc. Client 112 includes any computer system or interface. For example, client 112 is operated by a user to receive and send electronic communications over network 104. Client 112 may include one or more of an operating system and applications running on an operating system or in a web browser. Client 112 operates one or more e-mail applications for receiving, viewing, and/or sending electronic communications, such as, for example an e-mail client. Such an e-mail application may be uniform across all clients 112 or varied based on the device used to operate the e-mail application—e.g., mobile device, desktop/laptop, tablet, phone etc. An e-mail application may be provided as a service via the cloud or any other communications platform.

Figure 2:
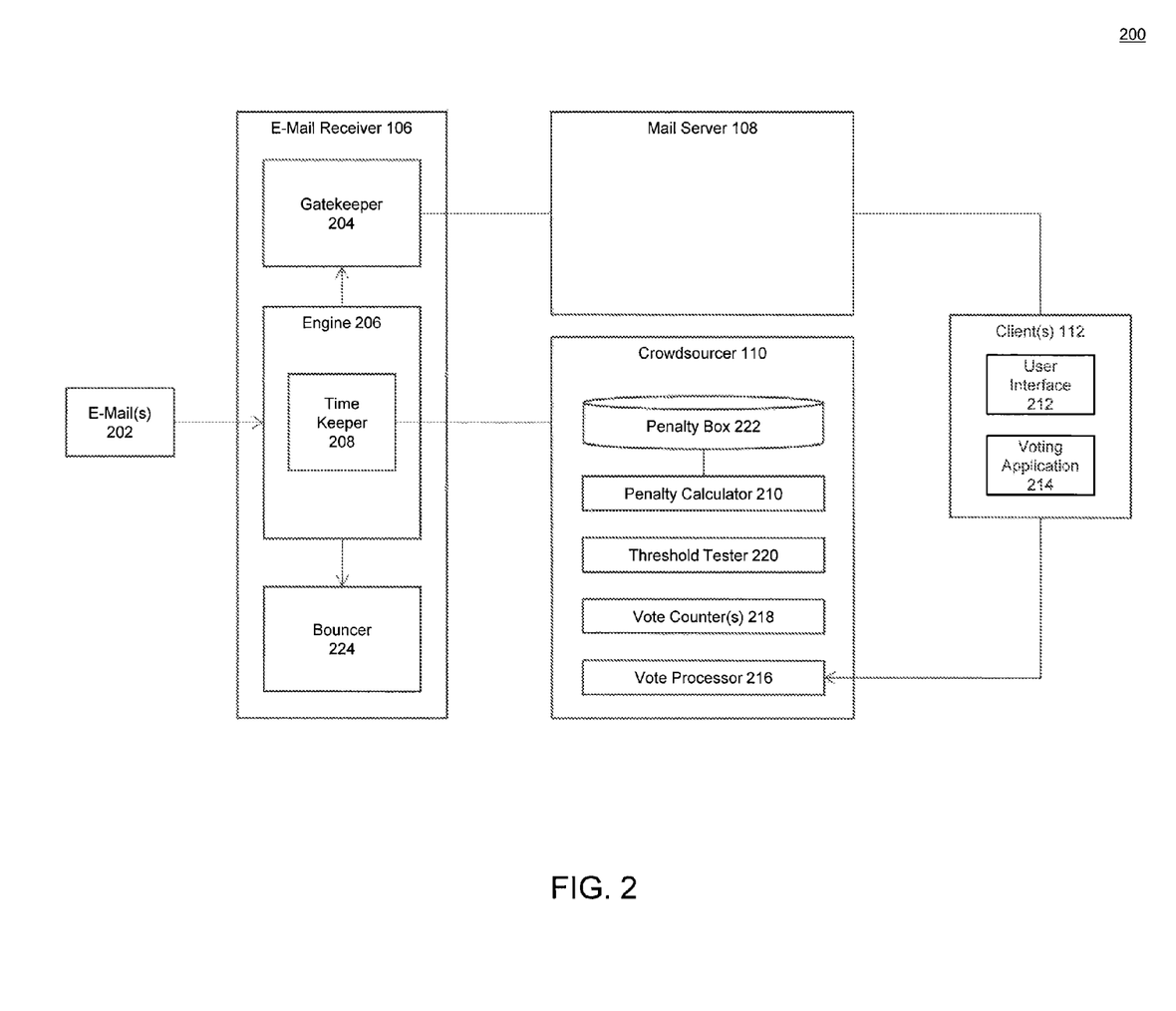
FIG. 2 is an expanded view of various system components for crowdsourcing e-mail filtering, according to an example embodiment.

FIG. 2 shows an expanded view of an example voting system 200 for receiving inputs from one or more users in a community indicating that an e-mail 202 received by a particular user in the community is unwanted. In an example embodiment, voting system 200 denies delivery of future unwanted e-mails until a penalty period expires against one or more e-mail originators 102. In an example embodiment, voting system 200 receives one or more e-mails 202 at e-mail receiver 106. E-mail receiver 106 includes one or more of a gatekeeper 204, an engine 206, and a bouncer 224. Gatekeeper 204 is connected to mail server 108. Engine 206 is connected to a penalty box 222 and is thereby also linked to crowdsourcer 110. Engine 206 may include a time keeper 208. Each of mail server 108 and crowdsourcer 110 may be connected to one or more clients 112. Client 112 may serve as an interface to a user for interacting with voting system 200. A user may be a member of one or more communities. By way of non-limiting example, a user community may be a community of employees within an enterprise or organization, subsets of which may be defined using methods which are known to persons of skill in the relevant art(s), such as, for example, an enterprise directory or role-based enterprise management system. In a non-limiting example, a community may be a voluntary association of users. Users may be registered or unregistered, participating or non-participating, or any combination of active or inactive roles within a community useful for purposes of crowdsourcing.

In an example embodiment, a user of client 112 may be displayed a user interface 212 for reviewing electronic communications to which a voting application 214 provides functionality. Voting application 214 and user interface 212 may operate in the computer environment of client 112 paired with a user and/or be provided as a service—e.g., via the cloud. For example, client 112 may load a module or set of instructions for rendering user interface 212 and then instantiating and/or sending and receiving data processed by voting application 214. For example, client 112 may load such executable instructions using a browser and associated web application and/or other application executing on client 112.

In an example embodiment, user interface 212 is associated with client 112 and displays one or more voting input elements to a user of client 112. A voting input element may be, for example, a button, selector, drag-and-drop element, tagging controller, hyperlink, or other element for providing input and any combination thereof. Input provided is propagated or otherwise transmitted to voting application 214 for processing. In a non-limiting example, a user of client 112 operating an e-mail application/client views an e-mail 202 forwarded to its address by mail server 108. Upon reviewing e-mail 202, the user decides that e-mail 202 is unwanted. The user may then select the input element displayed by user interface 212. User interface 212 receives the input provided by the user. Such an input element may appear in the e-mail application itself—e.g., in a ribbon, banner, toolbar, as a widget or drop-down item etc.—and/or in a freestanding application window, screen, tab, layout element, a pop-up or the like. The input provided to user interface 212 is received by voting application 214. A user may forward a copy of the unwanted email 202 directly to the voting application 214. Voting application 214 may also cause the e-mail application to propagate the unwanted e-mail 202 (e.g., by copying, transcoding, linking to an archive or stored copy, and/or forwarding) alone or in combination with its associated metadata. For example, voting application 214 receives user input along with a copy of the unwanted e-mail 202 and any associated metadata. Metadata may include but is not limited to header fields, data associated with the body, and/or Simple Mail Transfer Protocol (SMTP) trace information. Metadata may include other data generated and/or stored by mail server 108.

In an example embodiment, voting application 214 transforms the user input and propagated e-mail 202 into a voting data structure. By way of non-limiting example, this may include a discrete file, data stream, and/or feed that includes a structured break-down of its contents—e.g., transcoded into Extensible Markup Language (XML)—such that the contents are rendered amenable to parsing. Such a voting data structure is transmitted to a vote processor 216. Vote processor 216 parses and decomposes the voting data structure into an abstract which may include an indication of the identity of e-mail originator 102 based on, for example, structured information obtained from the header of e-mail 202. In an example embodiment, an individual sender may be identified as an originator, as well as the organization the individual sender is associated with. Such an association may be determined based on domain information associated with the individual sender's e-mail address or other source of identification. Vote processor 216 may be configured to sort by organizational e-mail originator 102 and/or by individual sender e-mail originator 102. In an example embodiment, vote processor 216 identifies the user associated with receipt of the unwanted e-mail. Such user identification may be present in associated metadata, such as, for example, obtained by voting application 214 during one or more collections of user account information made available by the e-mail application operating on client 112. In this manner, user input is associated with a particular user in the community and in turn is associated with the unwanted e-mail 202 being parsed by vote processor 216.

In an example embodiment, vote processor 216 parses countable indicia from the voting data structure. By way of non-limiting example, countable indicia may include, but is not limited to, a numerical count to be incremented up by one for each unwanted e-mail 202 received from a unique e-mail originator 102. Unique may be defined with respect to the individual sender of the unwanted e-mail 202 and/or the organization the individual sender is associated with—e.g., particular salesperson associated with a particular vendor, all unwanted e-mail 202 received from a particular vendor, association of vendors etc. In this manner, vote processor 216 stores countable indicia in one or more vote counters 218 which may be configured to provide running tallies and generate summary statistics based on criteria provided in the voting data structure. By way of a non-limiting example, vote counter 218 may be configured to account for gaming of voting system 200—e.g., by a single user in the community providing repeated inputs, to weight counts in accordance with seconding from other users in the community, to count votes over a span of time.

In an example embodiment, vote counter 218 generates a count based on a pre-defined ratio of unique votes to unique community users who have voted—e.g., total of x votes across y unique community users—in a process that receives parsed voting data and dynamically decodes, indexes, and cross-indexes the indicia provided by vote processor 216 in order to generate a dynamically and/or automatically generated result. Results may be generated in the form of computer-readable encoded output. Encoded output may be linked in terms of its value to one or more configuration files stored and/or cross-indexed by crowdsourcer 110. Encoded output is determined by crowdsourcer 110 to correspond to one or more threshold values. A threshold may be a ratio, absolute value, or any value capable of signifying that a sufficient number of unique votes from community users have been received to initiate a penalty process. Thresholds may be based on the configuration of vote counter 218 and/or may be configured dynamically in response to various states of voting system 200. By way of non-limiting example, a threshold may include a majority (simple or qualified) vote, proportional vote, semi-proportional vote, conditional etc. A threshold may be linked to one or more types of encoded output that may be specified by the configuration file to apply, for example, when certain conditions are met. A threshold tester 220 applies configurations to encoded output such that one or more penalties may be initiated when specified conditions are met—e.g., greater than x unique votes received from y unique users and/or over a time period of z days, or any other logic statement.

Threshold tester 220 may include various inputs for configuration. In an example embodiment, a console in crowdsourcer 110 allows a user to configure threshold values and/or to specify conditions for execution by threshold tester 220 based on results and/or encoded output generated by one or more vote counters 218. Such a console may include a user interface or other interface useful for generating configurations or programming a configuration file directly into crowdsourcer 110. Such configurations may embody one or more policies for crowdsourcing the filtering of unwanted e-mails based on community voting. Processes for filtering may be governed by this or other processes involving the processing, counting, testing, and penalizing of e-mail originators 102 for sending various amounts or frequencies of unwanted e-mail 202. For example, a configuration interpreted by threshold tester 220 may assign a frequency as well as a count to an encoded output of vote counter 218. Such a frequency may take into account a variable of time as an indicia parsed by vote processor 216 from metadata associated with the unwanted e-mail 202. All such indicia and annotations by threshold tester 220 may be stored on crowdsourcer 110.

In an example embodiment, threshold tester 220 generates a signal received by a penalty calculator 210 when a threshold is exceeded. Such signal may include an encoded message and/or a data packet containing a data structure. Such a data structure may also contain the encoded output of vote counter 218 and/or any code associated with the tally itself with respect to exceeding the threshold—e.g., a particular e-mail originator 102 has sent x unwanted emails 202 to y unique community users in the past z hours and/or over the past z weeks, days, years etc. Penalty calculator 210 may in turn calculate a penalty to be associated with breach of the signaled threshold. Such penalties may be configured or dynamically reconfigured based on various criteria, including threshold configurations, a state associated with voting system 200, and/or other inputs or instructions provided by a user interacting with a console and/or programming interface connected to crowdsourcer 110. By way of a non-limiting example, a penalty may include one or more flags against an e-mail originator 102 being assigned by penalty calculator 210 to the individual sender of the unwanted e-mail 202 and/or the organizations associated with the individual sender of the unwanted e-mail 202. Penalty calculator 210 may assign degrees of breach above a threshold using such flags—e.g., to track accrual of repeat offenses. When sufficient flags have been assigned, penalty calculator 210 generates a citation and writes a record of the citation to one or more penalty boxes 222 associated with crowdsourcer 110.

In an example embodiment, a citation includes a series of codes which correspond to one or more stock narratives. Such narratives correspond to criteria used by threshold tester 220 and/or penalty calculator 210 for signaling and/or flagging the offending e-mail originator 102 for exceeding the one or more thresholds. The narrative may include form elements such as a salutation, message body of explanatory text, etc. In such a narrative, codes assigned to flags are translated into a communication that will be meaningful to the e-mail originator 102—e.g., "Hello [Originator], we regret to inform you that your e-mail has not been delivered to its intended recipient, [Username] You have sent [x] unwanted e-mails to [Organization] in the past [y] day(s). You will not be able to send more e-mails to [Organization/Username] for [z] weeks. Further attempts will only increase this period of time. Please adjust your methods of communication accordingly." Narratives may be stored in templates and/or customized based on attributes associated with the originator and/or the voting community. The communication may also include an indication of the particular community member(s) who indicated that the e-mail received was unwanted. Rejection templates may be customized and addressed to multiple addresses within the domain associated with unwanted e-mail. For example, a rejection communication may be sent directly to the particular offending e-mail originator 102 and a different rejection communication addressed to, for example, a general mailbox for the offending domain. Alternatively, a first e-mail communication may be sent to the originator 102 and a different e-mail communication may be sent to anyone that shares the email domain, for example, with originator 102. This different communication might, for example, identify the offending originator 102 by name thus allowing his colleagues to know why they can no longer send emails to a particular entity. In other words, the narrative of the email communication may be different depending on the audience (i.e., originator v. group associated with originator). Also, in another example embodiment, a rejection communication may be sent to an address associated with the particular offending e-mail originator 102 (e.g., within a group and/or a domain associated with the particular offending e-mail originator 102) indicating the name of the particular offending e-mail originator 102 and a reason for the penalty. As mentioned, this rejection narrative may also identify the community member(s) who indicated that the e-mail was unwanted and/or triggered penalization.

A citation includes one or more codes which may correspond to instructions for affecting or determining the routing of future messages received at e-mail receiver 106 from the penalized individual sender, and/or any sender from the organization associated with the penalized individual, e-mail originator 102. A citation may include an expiration date as determined by penalty calculator 210 to be the date or time when such penalty is to be lifted. A citation may take the form of a data structure or other format stored in penalty box 222 with links to and/or instantiations of associated codes, routing instructions, voting data structure, metadata etc.

In an example embodiment, future e-mail 202 generated by e-mail originator 102 is received at e-mail receiver 106. Future e-mail 202 is processed by engine 206 to review header fields in order to identify whether e-mail 202 has been sent by an e-mail originator 102 indexed as and/or associated with one or more citations in penalty box 222. If e-mail 202 is determined to be from an e-mail originator 102 indexed in penalty box 222, a time keeper 208 is prompted by engine 206 to determine if the penalty has expired or remains in force against the individual sender and/or organization associated with the individual sender. If the assigned penalty has not expired and/or a citation remains in force against e-mail originator 102, engine 206 executes the associated routing codes and instructions, redirecting incoming e-mail 202 to bouncer 224. Engine 206 associates the redirected e-mail with the citation narrative and/or any supporting codes. Engine 206 populates any variables based on calculations and determinations performed by time keeper 208. In an example embodiment, further e-mails during the penalty period may increase the penalty and/or the duration of the penalty. E-mail originator 102 may also be notified of the rules associated with increasing the penalty and may thus be incented to improve such sending behavior. Immediate cessation of unwanted e-mail 202 may trigger a diminution of such a penalty. E-mail originator 102 may be notified of the rules associated with decreasing the penalty period and may thus be incented to improve their sending behavior.

In an example embodiment, bouncer 224 receives the redirect and narrative from engine 206 and denies delivery of the e-mail 202. Bouncer 224 may execute such denial using standard SMTP rejection protocol and embedding the narrative into the rejection. In this manner, the penalized e-mail originator 102 is notified that the e-mail 202 has been rejected and is provided with a narrative explanation for why they have been penalized—e.g., for sending too much unwanted e-mail to the user community and/or sending such unwanted e-mail too frequently. The notification sent to penalized e-mail originator 102 may include in the narrative embedded in the rejection message the particular community member and/or a listing of community members who collectively indicated that unwanted e-mail was received. If engine 206 instead determines that e-mail 202 is not from an e-mail originator 102 indexed and/or associated with an outstanding citation with respect to penalty box 222, then e-mail 202 is instead routed to gatekeeper 204 to proceed along the path to its intended recipient—e.g., one or more of clients 112—via mail server 108. In this manner, e-mail receiver 106 directs incoming e-mail 202 through engine 206 for appropriate routing using crowdsourced filtering.

Figure 3:
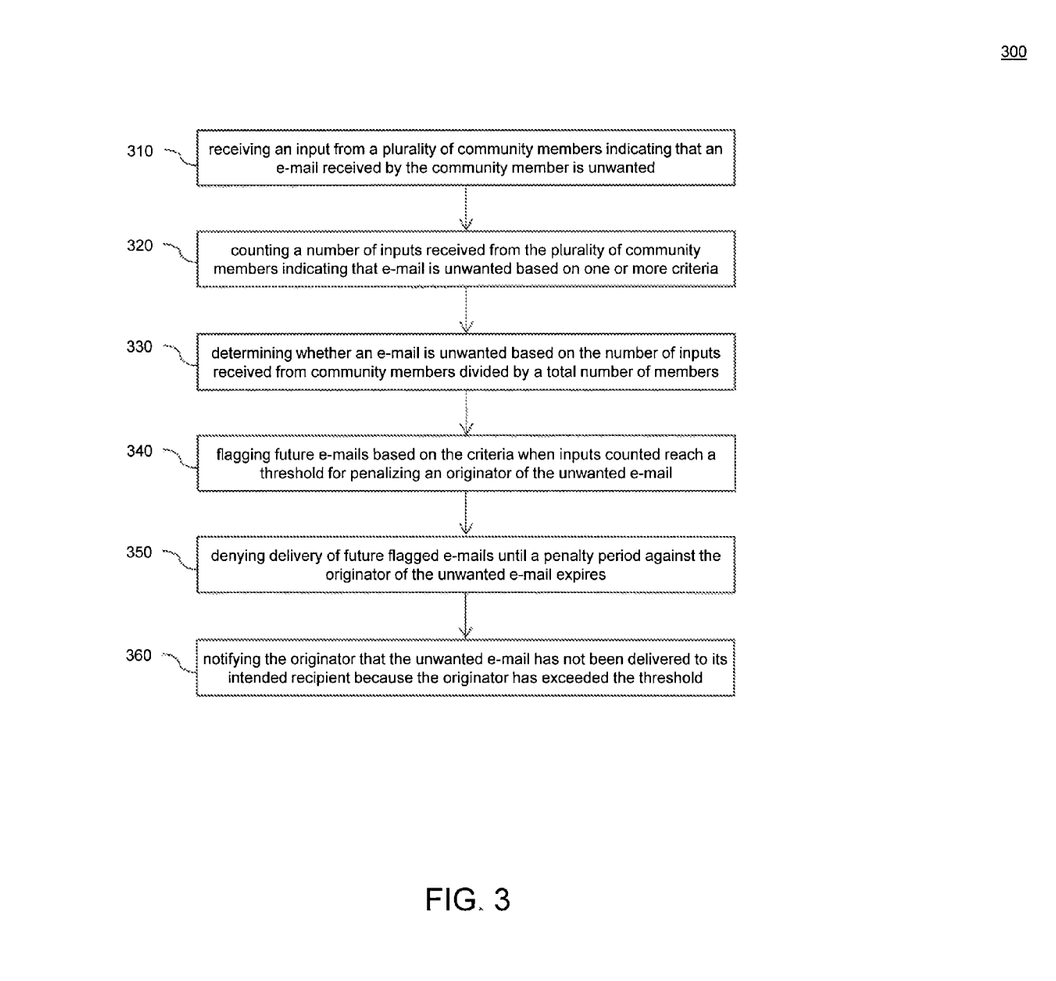
FIG. 3 is a flowchart of a process for crowdsourcing e-mail filtering, according to an example embodiment.

FIG. 3 is a flow diagram showing a method for crowdsourcing e-mail filtering, according to an example embodiment. Method 300 begins at step 310, where input from a community member, such as a user of client 112 and/or an associated e-mail application, is received indicating that an e-mail received by the community member is unwanted. The indication may be obtained by displaying a voting input element to a community member in user interface 212 which may be associated with an e-mail application. A voting input element is configured to receive input from one or more community members indicating that e-mail received by the one or more community members is unwanted. Input is sent to voting application 214, which receives the input for processing.

In an example embodiment, in step 320, a number of inputs received from one or more community members is counted, the inputs indicating that e-mail is unwanted based on one or more criteria. Counting may include measuring the number of inputs received over a predetermined period of time from each of the one or more community members. Counting may include calculating a frequency associated with the unwanted e-mail based on criteria. Criteria include a named individual or a domain associated with the unwanted e-mail. Counting may be performed by vote counter(s) 218 and associated components of crowdsourcer 110 including, for example, vote processor 216 which receives a voting data structure that may include information such as a named individual or a domain associated with the unwanted e-mail. Vote processor 216 parses a voting data structure and abstracts this type of information for processing by crowdsourcer 110.

In an example embodiment, a community member may be displayed a notification and/or indication of how many and/or which community users provided negative input—e.g., an e-mail application or other user interface provides a value display indicating that x number of community members have voted that e-mail 202, currently under review, from a particular originator, and/or a particular type of e-mail is unwanted. The user interface may also provide an input element for providing a positive vote to counteract the negative input of other users. Such input, whether positive or negative, may be processed by any of the components of crowdsourcer 110, such as vote processor 216 and vote counters 218.

In an example embodiment, in step 330, whether or not an e-mail is unwanted is determined based on the number of inputs received from community members divided by a total number of members. In an example embodiment, inputs from community members are transformed into a filter for unwanted e-mails 202. This method of crowdsourcing the filtering of unwanted e-mail is enabled by at least the operations and capabilities of vote counters 218, threshold tester 220, penalty calculator 210, penalty box 222, and e-mail receiver 106, which may operate to redirect and filter unwanted e-mails 202.

In an example embodiment, in step 340, future e-mails are flagged based on the criteria when inputs counted reach a threshold for penalizing an e-mail originator 102 of unwanted e-mail 202. In an example embodiment, such flagging may be performed by penalty calculator 210 in accordance output of threshold tester 220. Flagging unwanted e-mails 202 thus determines whether an e-mail originator 102 will be penalized and/or for how long. When sufficient flags have been assigned, penalty calculator 210 may generate a citation stored for access by engine 106 in penalty box 222. In turn, future e-mails 202 processed by engine 206 are associated with their flagged counterparts in penalty box 222 and are themselves flagged based on the criteria used to penalize e-mail originator 102. In this manner, engine 106 may redirect the normal flow of e-mail through a filter such that, once flagged, any inbound e-mail from a penalized e-mail originator 102 is rejected using a Simple Mail Transfer Protocol (SMTP) rejection protocol by bouncer 224.

In an example embodiment, in step 350, delivery of flagged e-mail is denied until a penalty period against the originator of the unwanted e-mail expires. Engine 206 uses timekeeper 208 to determine whether a penalty has expired or remains in force based on a query of penalty box 222. Bouncer 224 is configured to reject the unwanted e-mail 202 if the penalty is found to remain in force, as directed by engine 206.

In an example embodiment, in step 350, the e-mail originator 102 is notified that the unwanted e-mail 202 has not been delivered to its intended recipient. In an example embodiment, the e-mail originator 102 is provided with a narrative message generated by engine 206, based on data retrieved from penalty box 222 and/or dynamic calculation of a penalty duration performed by time keeper 208, which indicates that the reason for denial is because the e-mail originator 102 has exceeded the threshold. Narratives correspond to the criteria used by threshold tester 220 and/or penalty calculator 210 for signaling and/or flagging the offending e-mail originator 102 for exceeding the one or more thresholds. In this manner, the penalized e-mail originator 102 is notified that the e-mail 202 has been rejected and is provided with a narrative explanation for why they have been penalized.

Example Computer System

Figure 4:
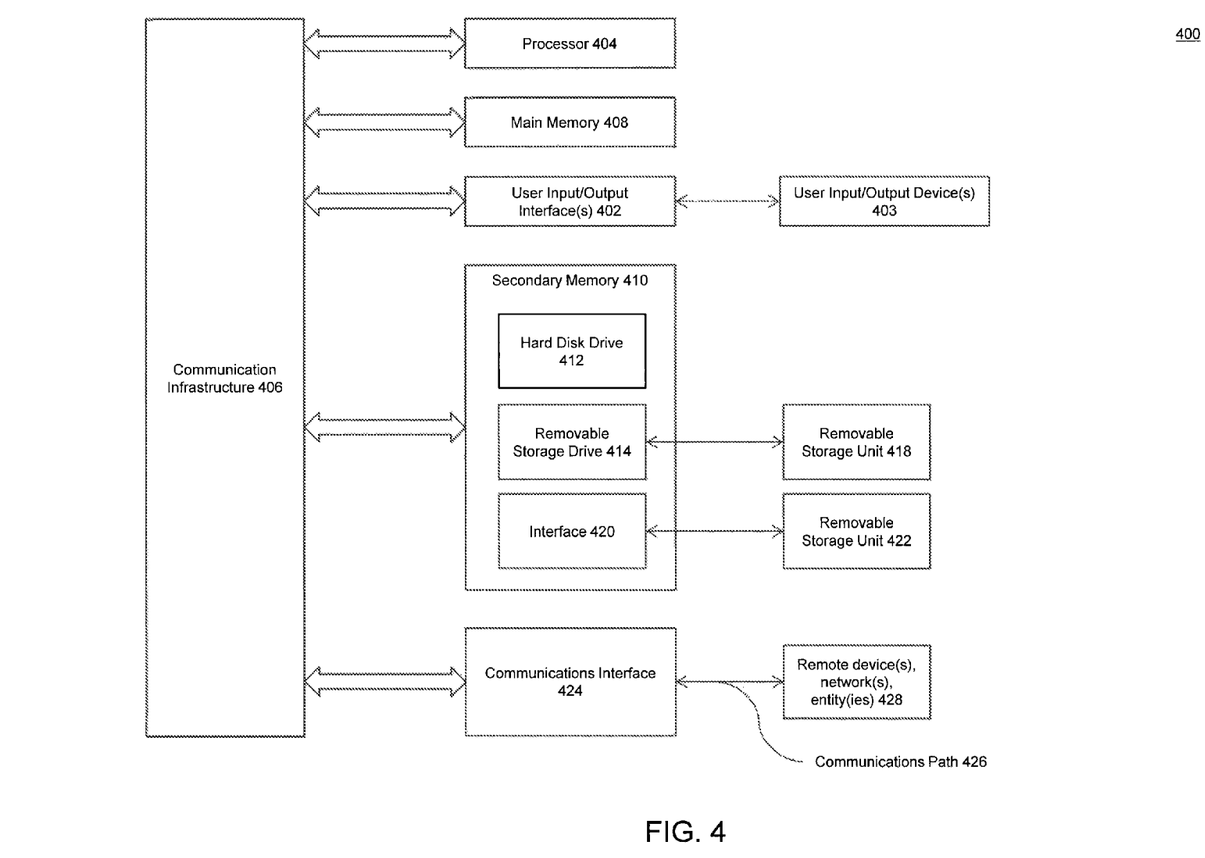
FIG. 4 is an example computer system for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). Communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it would be within the knowledge of persons skilled in the relevant arts to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for crowdsourcing e-mail filtering, comprising:
   receiving, at a crowdsourcer, a data structure from an e-mail client of a community member, the data structure indicating that an e-mail received from an originator or a group associated with the originator by the community member is unwanted, wherein the data structure includes data from the community member and the e-mail;
   aggregating indicia included in the data and the e-mail in the data structure with indicia within a plurality of data structures received from e-mail clients of other community members, the plurality of data structures indicating that one or more e-mails received from the originator or the group are unwanted, wherein the aggregated indicia is based on one or more criteria;
   flagging the originator or the group as a source of unwanted e-mails responsive to a determination that the aggregated indicia reaches or exceeds a threshold;
   reviewing future e-mails, received at the crowdsourcer, to identify whether the received future e-mails are sent by the flagged originator or the group; and
   denying delivery of every future e-mail, from the reviewed future e-mails, identified as being sent by the flagged originator or the group to the e-mail client of the community member until a penalty period associated with the flagged originator or the group expires.

2. The method of claim 1, further comprising:
   notifying the originator or the group associated with the originator that the received future e-mail has not been delivered to its intended recipient because the originator or the group associated with the originator has exceeded the threshold.

3. The method of claim 1, further comprising:
   determining whether the e-mail is unwanted based on a number of indicia aggregated from data structures received from unique community members.

4. The method of claim 1, wherein the receiving further comprises:
   displaying a voting input element in a user interface associated with the e-mail client of the community member, the voting input element configured to receive data from the community member indicating that the e-mail received by the community member is unwanted.

5. The method of claim 1, wherein the aggregating further comprises:
   measuring a number of data structures received over a predetermined period of time from each community member; and
   calculating a frequency associated with the unwanted e-mail included in the data structures based on the one or more criteria, wherein the one or more criteria includes a named individual or a domain associated with the unwanted e-mail.

6. The method of claim 1, the flagging further comprising:
   redirecting, using an e-mail receiver, a normal flow of e-mail through a filter such that, once flagged, any inbound e-mail from the originator or the group associated with the originator is rejected using a Simple Mail Transfer Protocol (SMTP) rejection protocol.

7. The method of claim 1, the denying further comprising:
   specifying that the penalty period expires within a predetermined time period; and
   increasing a duration of the penalty period each time the same originator is flagged.

8. A system, comprising:
   a crowdsourcer stored in a memory and operable to execute on at least one processor and configured to:
      receive a data structure from an e-mail client of a community member, the data structure indicating that an e-mail received from an originator or a group associated with the originator by the community member is unwanted, wherein the data structure includes data from the community member and the e-mail;
      aggregate indicia included in the data and the e-mail in the data structure with indicia within a plurality of data structures received from e-mail clients of other community members, the plurality of data structures indicating that one or more e-mails received from the originator or the group are unwanted, wherein the aggregated indicia is based on one or more criteria;
      flag the originator or the group as a source of unwanted e-mails responsive to a determination that the aggregated indicia reaches or exceeds a threshold;
      review future e-mails, received at the crowdsourcer, to identify whether the received future e-mails are sent by the flagged originator or the group; and
      deny delivery of every future e-mail, from the reviewed future e-mails, identified as being sent by the flagged originator or the group to the e-mail client of the community member until a penalty period associated with the flagged originator or the group expires.

9. The system of claim 8, wherein the crowdsourcer is further configured to:
   notify the originator or the group associated with the originator that the received future e-mail has not been delivered to its intended recipient because the originator has exceeded the threshold.

10. The system of claim 8, wherein the crowdsourcer is further configured to:
    determine whether the e-mail is unwanted based on a number of indicia aggregated from data structures received from unique community members.

11. The system of claim 8, wherein the e-mail client of the community member is configured to:
    display a voting input element in a user interface associated with the e-mail client of the community member, the voting input element configured to receive data from the community member indicating that the e-mail received by the community member is unwanted.

12. The system of claim 8, wherein the crowdsourcer is further configured to:
    measure a number of data structures received over a predetermined period of time from each community member; and calculate a frequency associated with the unwanted e-mail included in the data structures based on the one or more criteria, wherein the one or more criteria includes a named individual or a domain associated with the unwanted e-mail.

13. The system of claim 8, further comprising an e-mail-receiver configured to:
redirect a normal flow of e-mail through a filter such that, once flagged, any inbound e-mail from the originator or the group associated with the originator is rejected using a Simple Mail Transfer Protocol (SMTP) rejection protocol.

14. The system of claim 8, further comprising an e-mail-receiver configured to:
specify that the penalty period expires within a predetermined time period; and
increase a duration of the penalty period each time the same originator is flagged.

15. A non-transitory computer-readable device having instructions stored thereon that, when executed by at least one computing device, causes the at least one computing device to perform operations comprising:
receiving, at a crowdsourcer, a data structure from an e-mail client of a community member, the data structure indicating that an e-mail received from an originator or a group associated with the originator by the community member is unwanted, wherein the data structure includes data from the community member and the e-mail;
aggregating indicia included in the data and the email in the data structure with indicia within a plurality of data structures received from e-mail clients of other community members, the plurality of data structures indicating that one or more e-mails received from the originator or the group are unwanted, wherein the aggregated indicia is based on one or more criteria;
flagging the originator or the group as a source of unwanted e-mails responsive to a determination that the aggregated indicia reaches or exceeds a threshold;
reviewing future e-mails, received at the crowdsourcer, to identify whether the received future e-mails are sent by the flagged originator or the group; and
denying delivery of every future e-mail, from the reviewed future e-mails, identified as being sent by the flagged originator or the group to the e-mail client of the community member until a penalty period associated with the flagged originator or the group expires.

16. The computer-readable device of claim 15, the operations further comprising:
notifying the originator or the group associated with the originator that the received future e-mail has not been delivered to its intended recipient because the originator or the group associated with the originator has exceeded the threshold.

17. The computer-readable device of claim 15, the operations further comprising:
determining whether the e-mail is unwanted based on a number of indicia aggregated from data structures received from unique community members.

18. The computer-readable device of claim 15, the operations further comprising:
displaying a voting input element in a user interface associated with the e-mail client of the community member, the voting input element configured to receive data from the community member indicating that the e-mail received by the community member is unwanted.

19. The computer-readable device of claim 15, the operations further comprising:
measuring a number of data structures received over a predetermined period of time from each community member; and
calculating a frequency associated with the unwanted e-mail included in the data structures based on the one or more criteria, wherein the one or more criteria includes a named individual or a domain associated with the unwanted e-mail.

20. The computer-readable device of claim 15, the operation of flagging further comprising:
redirecting a normal flow of e-mail through a filter such that, once flagged, any inbound e-mail from the originator or the group associated with the originator is rejected using a Simple Mail Transfer Protocol (SMTP) rejection protocol.

21. The method of claim 1, wherein the aggregated indicia includes characteristics included in the e-mail.

22. The method of claim 1, further comprising:
formatting the e-mail and the data into a format amenable to parsing; and
including the formatted e-mail and the data into the data structure.

23. The method of claim 1, wherein the flagged future e-mail is received from the originator, the denying comprising:
denying delivery of a future e-mail from other originators sharing a same corporate domain with the originator of the flagged future e-mail.

* * * * *